(12) United States Patent
Kim

(10) Patent No.: US 6,480,583 B1
(45) Date of Patent: Nov. 12, 2002

(54) METHOD FOR PROVIDING INFORMATION SERVICES IN CHARACTERS THROUGH ISDN

(75) Inventor: Tae-Gyu Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/472,564

(22) Filed: Dec. 27, 1999

(30) Foreign Application Priority Data

Dec. 24, 1998 (KR) .............................................. 98-58361

(51) Int. Cl.[7] .............................................. H04M 11/00
(52) U.S. Cl. .................................. 379/93.17; 379/93.14
(58) Field of Search ........................... 379/93.17, 93.23, 379/93.01, 93.14, 156, 157, 164, 231, 234

(56) References Cited

U.S. PATENT DOCUMENTS 5,937,040 A * 8/1999 Wrede et al. ............ 379/93.23
6,292,548 B1 * 9/2001 Jreij et al. ............... 379/93.17

* cited by examiner

Primary Examiner—Stella Woo
(74) Attorney, Agent, or Firm—Klauber & Jackson; Steve Cha

(57) ABSTRACT

A method for providing information services to display the character information on terminals by a PBX through an ISDN, the method comprising the steps of registering a subscriber's request of character information services according to a given menu by connecting a specified port to the ISDN, determining whether corresponding terminal is registered for the character information services upon receiving a service message, and transferring the service message to be displayed in characters on the registered terminal.

10 Claims, 4 Drawing Sheets

METHOD FOR PROVIDING INFORMATION
SERVICES IN CHARACTERS THROUGH
ISDN

CLAIM OF PRIORITY

This application makes reference to, incorporates the same herein, and claims all benefits accruing under 35 U.S.C. Section 119 from an application for METHOD OF PROVIDING INFORMATION SERVICES IN CHARACTER THROUGH ISDN filed earlier in the Korean Industrial Property Office on the 24th day of Dec. 1998 and there duly assigned Ser. No. 58361/1995.

BACKGROUND OF THE INVENTION

1. Field of the Invention

The present invention relates to a method for providing information services in the form of characters by PBX (Private Branch Exchange) through ISDN (Integrated Services Digital Network).

2. Description of the Related Art

The ISDN is a network designed to bring the features of PBX systems and high speed data-transfer capability to the standard telephone system to provide a wide variety of digital services to subscribers. These many available services include digital voice telephone, interactive information, fax, electronic mail, and wideband digital video services. Before the ISDN can be fully implemented, digital channels must be established to all end users, and the channels must be able to handle a variety of services with different bandwidth requirements and data rates. To this end, a standard interface must exist for all subscribers.

The ISDN interface usually includes "2B+D" multiplex system having two voice channels, the "B" channel which carries the customer's communication with the transmission speed of 64kbit/sec, and the "D" channel which provides control and signaling for the "B" channels with a transmission speed of 16 kbit/sec. The transmission speed of 64kbit/sec in the B-channel corresponds to a voice signal of a standard telephone that is modulated by the pulse code (PCM) according to the CCITT standard. The D-channel may be used to transmit control signals or data packets. For example, the control signals may be a sending signal and a dial signal being transferred from a telephone to a switching system and a call signal representing the sender's number and communication request data from a switching system to a telephone.

The foregoing various control signals are transmitted as data packets through D-channel. In addition, user-user information (UUI) data which is one of the messages as defined by the International Standard Organization (ISO) may be transmitted through D-channel to exchange short management message to be displayed on the terminals. Currently, the conventional communication system for the ISDN only provides voice or data communication services through B-channel, and not through D-channel.

SUMMARY OF THE INVENTION

It is one object of the present invention to provide a method for providing information services to display character information on the terminals by PBX through Integrated Services Digital Network (ISDN) services.

According to one embodiment of the present invention, there is provided a method for providing information services to display character information on terminals by the PBX through the ISDN services, the method comprising the steps of registering a subscriber's request of character information services according to a given menu by connecting a specified port to the ISDN, determining whether the corresponding terminal is registered for the character information services upon receiving a service message therefrom, and transferring the service message to be displayed in characters on the registered terminal.

According to another embodiment of the present invention, there is provided a method for providing information services to display character information on terminals by the PBX through the ISDN services, the method comprising the steps of transmitting a service message to a subscriber from the ISDN periodically; determining whether the service message is said character information; and, outputting the service message on a display unit of the terminal if the service message is the character information.

Another embodiment of the present invention provides a step for connecting the terminal with a specified port of the ISDN if the service message is not the character information.

Further embodiment of the present invention provides a step for determining whether the terminal is registered for the character information service if the service message is character information, and outputting the service message on the display unit of the terminal in response to a determination that the terminal is registered for the character information service.

Preferably, the message is UUI adapted according to the ISDN protocol for the character information service, and the message is transmitted through D-channel of the ISDN.

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

A BRIEF DESCRIPTION OF THE ATTACHED DRAWINGS

A DETAILED DESCRIPTION OF THE PREFERRED EMBODIMENT

Figure 1:
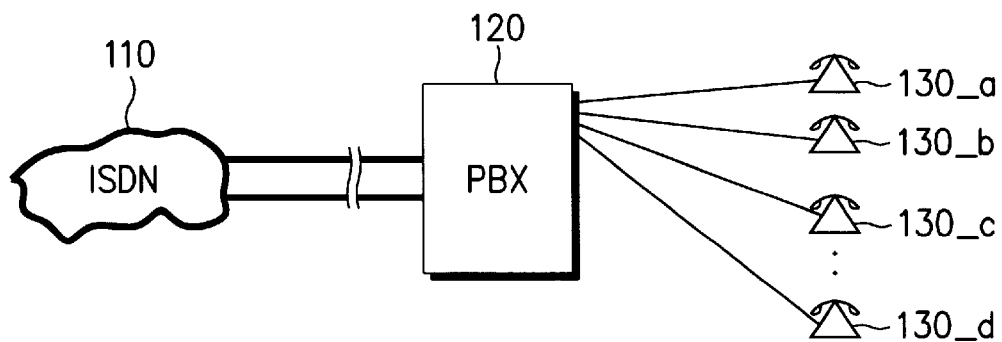
FIG. 1 is a schematic diagram for illustrating a general communication network to which the present invention is applied.

Referring to FIG. 1, a PBX 120 is connected to an ISDN 110 to provide information services to a plurality of subscribers 130_a to 130_d. The fundamental structure of the PBX 120 for the present invention may have exclusively or partly an ISDN office-line/extension circuit 230, as shown in FIG. 2.

Figure 2:
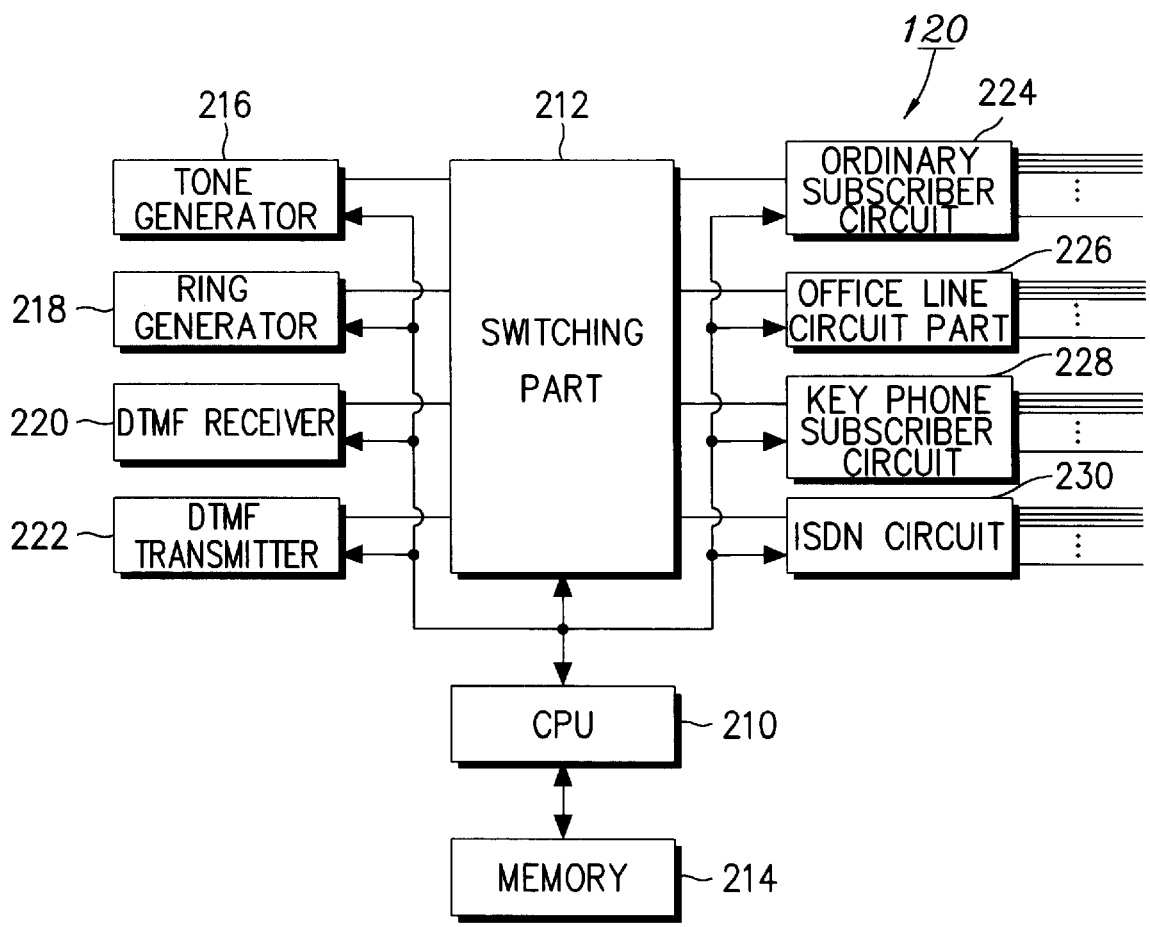
FIG. 2 is a block diagram for illustrating the conventional structure of a PBX according to an embodiment of the present invention.

Referring to FIG. 2, a CPU 210 is provided to control the operational functions of the PBX and the function of providing character information to a terminal through the ISDN service. The various signals of the PBX components are switched to each other by a switch part 212. A memory 214 stores the control program required for the CPU 210 and various data generated from the PBX. A tone generator 216 generates various tone signals provided by the PBX, such as a busy tone, a sending tone, a calling tone, and other tones. A ring generator 218 generates the ring signal that is supplied to the extensions of subscribers upon receiving a call request via the switching part 212. A DTMF (Dual Tone Multi-Frequency) receiver 220 analyzes a DTMF signal received through the switching circuit 212 and transmits to the CPU 210. A DTMF transmitter 222 generates a DTMF signal applied to the switching part 212. An ordinary subscriber circuit 224 interfaces the switching part 212 with the extension of a subscriber. An office line circuit part 226 includes an ordinary office line circuit and a DID interface to interface with the switching part 212. A key phone subscriber circuit 228 interfaces the switching circuit 212 with the extension of a key phone subscriber, and an ISDN circuit 230 interfaces the switching part 212 with the ISDN.

Figure 3:
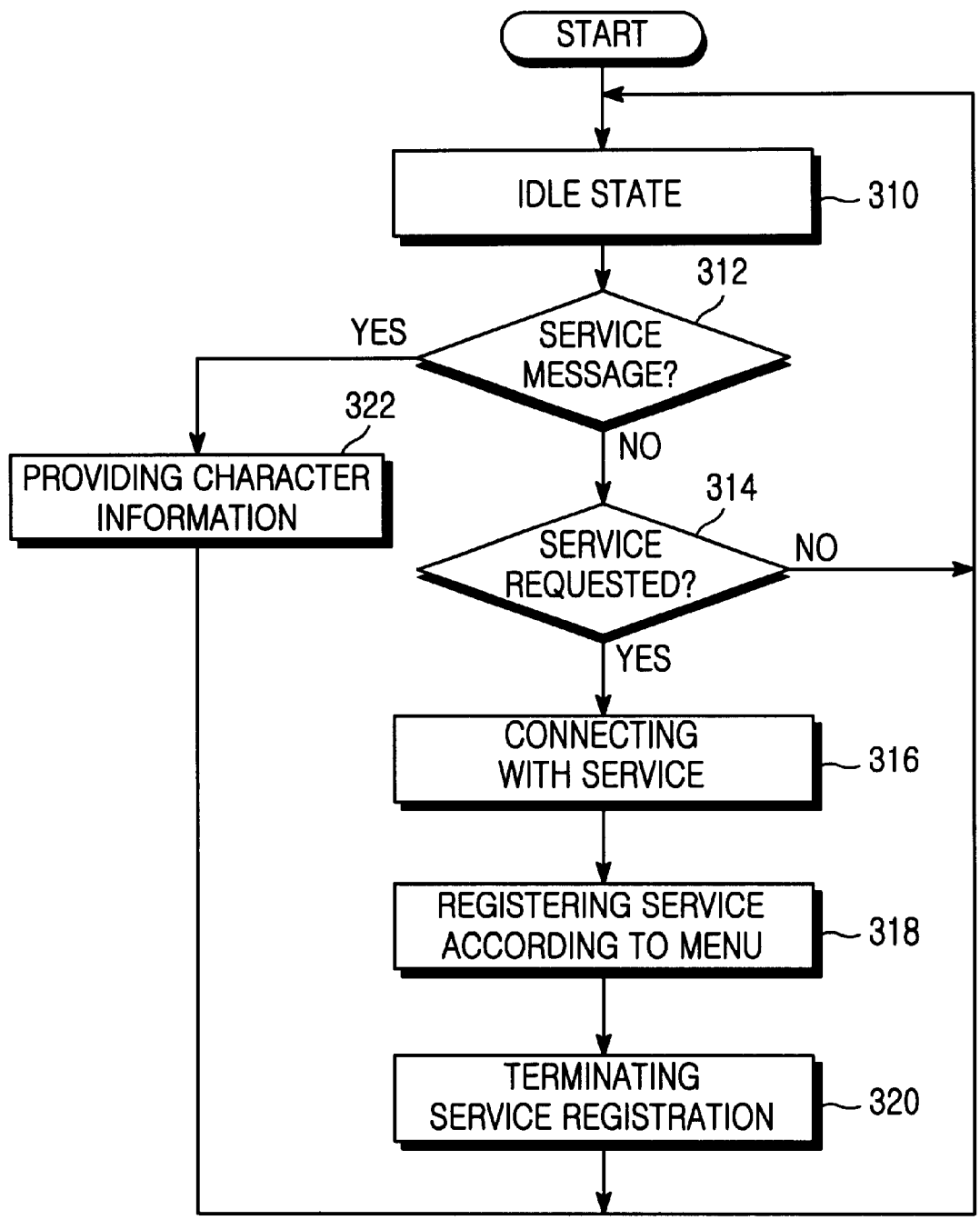
FIG. 3 is a flow chart for illustrating the process for registering service in order to provide character information services through a PBX according to an embodiment of the present invention.

FIG. 3 depicts a flow chart illustrating the process of registering services. The CPU 210 seizes a specified port of the ISDN to register a service request to the terminal of a subscriber in order to provide the character information service in response to a given selection in the menu feature of the terminal, determines whether the corresponding terminal is registered for the character information service upon receiving a service message signal from the ISDN, and transfers the service message to be displayed with characters on the terminal in the event that that the terminal is registered.

Figure 4:
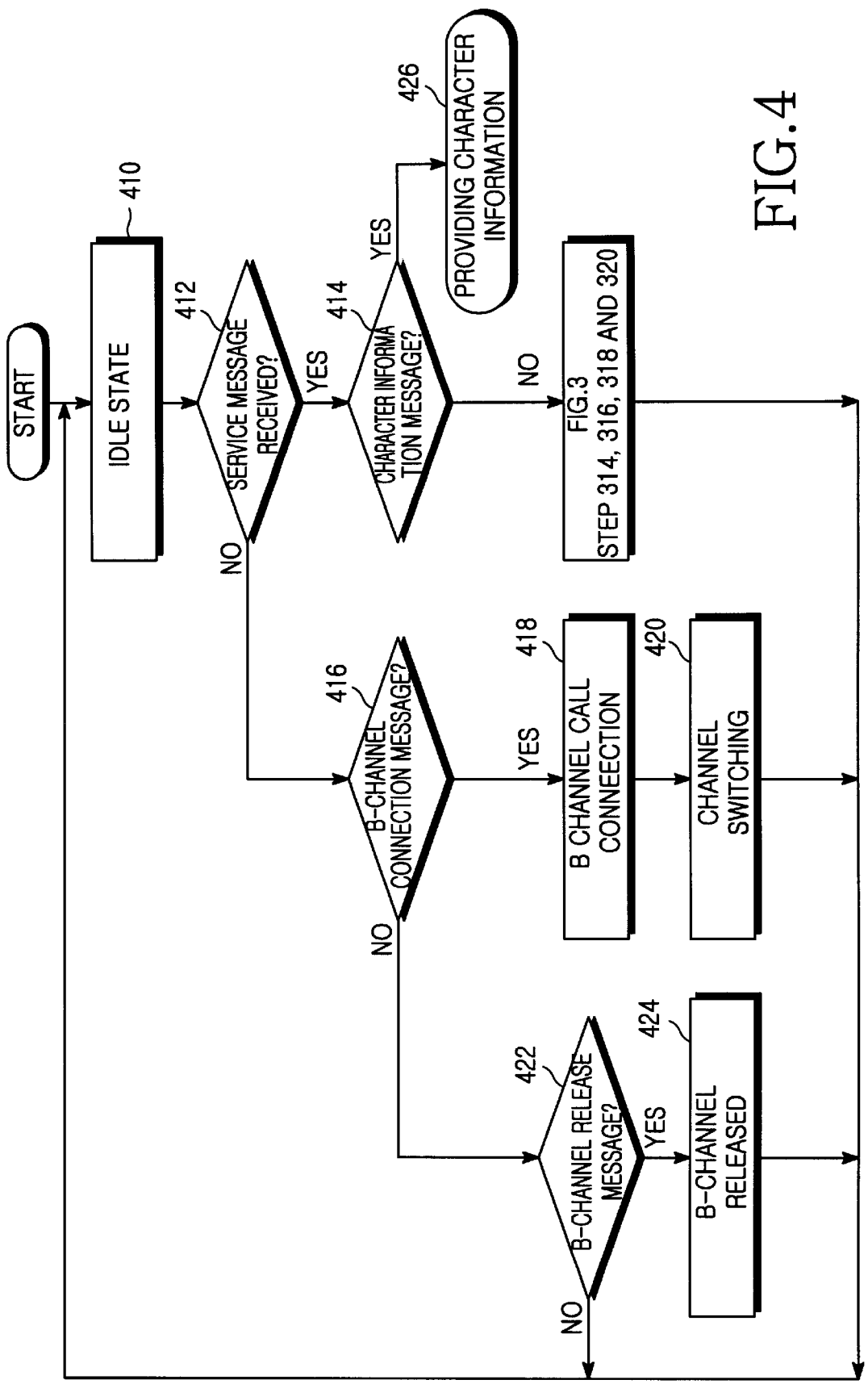
FIG. 4 is a flow chart for illustrating the process of transmitting character information via D-channel; and, FIG. 5 is a block diagram for illustrating the conventional structure of a PBX as a service provider according to another embodiment of the present invention.

FIG. 4 depicts a flow chart illustrating the process for generating character information via D-channel. When the system is in idle state, a service message is transmitted to the subscriber from the ISDN periodically, thus in step 412, the CPU 210 in idle state checks for whether any character information is received from the ISDN as set by the operator. In step 414, if any service message is received, the CPU 210 checks whether the received service message is character information message. At step 426, if the received service message is character information message, the character information message is directly outputted on the display unit of the terminal. However, if the service message is not character information message, namely registration information, in step 414, a message registration procedure is performed according to the procedure including steps 314, 316, 318, and 320 of FIG. 3.

Meanwhile, if the service message is not received in step 412, the CPU 210 checks whether B-channel connection message is received from the ISDN in step 416. If the B-channel connection message is received in step 416, the CPU 210 connects the B-channel in step 418 and the channel is switched accordingly in step 420. However, if the B-channel is not received—for example, if the B-channel is already been connected—the CPU 210 checks whether the B-channel release message is received in step 422. If the B-channel release message is received, the B-channel is released in step 424. If the B-channel release message is not received, the terminal of the subscriber goes into idle state.

Figure 5:
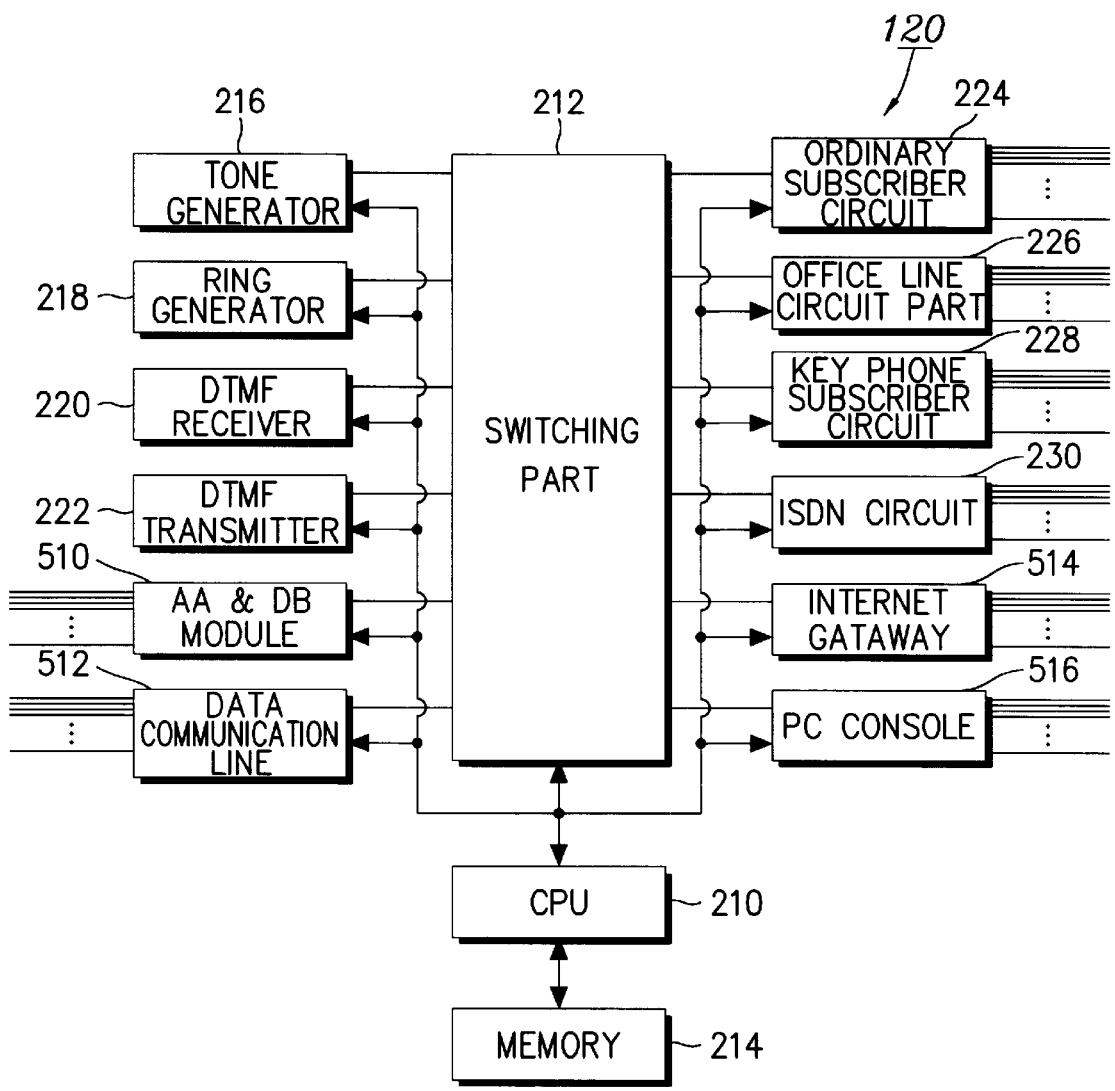

The PBX, as a service provider for providing character information services is shown in FIG. 5, where the information source may consist of a PC console, data communication line, internet line, etc., to provide character information in real time.

From this point, the process of providing character information through the ISDN service according to the present invention will be more specifically described. The ISDN service employs out band signaling to transfer the call control information through the D-channel. Generally, the D-channel transmits control information during a process that involves demanding, controlling and releasing a call. Otherwise, the channel is in idle state in the other times.

According to the present invention, the character information service is performed through the D-channel during an idle state. The process for registering the contents of character information service may be accomplished by direct communication with the operator of the PBX, or according to a given menu selection to initiate on-line registration during the on-line connection to the PBX. The on-line registration is achieved through steps 314 to 320, as shown in FIG. 3.

Referring to FIGS. 2 and 3, the CPU 210 repeats the loop from step 310 to step 314 to detect whether the terminal requests for the character information service. In step 312, service message is periodically received from the ISDN. In step 314, a user's specific request for setting the character information service is checked. Thus, upon detecting the request for the character information service in step 314, the CPU 210 proceeds to step 316 to connect a specific port of the ISDN capable of providing the character information service. The specific port has such functions as "auto announce", "DB", etc. Then, the CPU 210 controls the switching part 212 to connect the terminal requesting the character information service with the specific port of the ISDN. Furthermore, using a key pad, a voice message for the menu can be transmitted through the connected port to the subscriber of the terminal to input a desired input and/or other features of the services.

Accordingly, the CPU 210 receives a DTMF signal via the DTMF receiver 220 to perform the registration of the service. The signal requesting for character information service received from the terminal is converted into digital form using the DTMF receiver, which is then transferred to the CPU 210 via switching part 212. Upon completing the service registration, the CPU 210 proceeds to step 320 to terminate the call connecting process of the specific port of the ISDN, and the process returns to step 310.

Thereafter, the CPU 210 repeats the loop from step 310 and step 312 for detection of the receipt of a service message. Upon receiving the service message in step 312, the CPU 210 proceeds to step 322 to deliver the character information to the corresponding terminal that was previously registered through step 314–320. Namely, whenever character information is received through the D-channel, the CPU 210 transmits the character information when the corresponding terminal is registered for such service. The terminal should have a display unit for displaying character information. This, the character message transmitted through the D-channel should be adapted to the ISDN system meeting the requirements of the ISDN protocol. To this end, UUI message may be used as set forth under ISO standard.

Upon completing the subscriber's registration of the character information service, the CPU 210 of the PBX enables the character information to be transmitted to a display unit provided in the subscriber's ISDN terminal according to the registered information at a specified time, when necessary or continuously. Further, the content of the character information service may be altered by deleting or adding during the service or at any time as occasion demands.

In addition, if the service message received from the ISDN does not contain character information, the voice message may be transmitted through B-channel as in the prior art, as shown in the step 416 and its subsequent steps in FIG. 4.

Thus, the present inventive method provides the ISDN system with character information services through the D-channel without having any additional hardware as well as the basic voice and data communication services through the B-channels, thereby improving the utility of ISDN.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for providing a character information service to display character information on a terminal by a private branch exchange (PBX) through an integrated services digital network (ISDN), said method comprising the steps of:

registering a subscriber's request for said character information service during an idle state of a channel of said ISDN by connecting a terminal of said subscriber with a specified port of said ISDN that is capable of providing said character information service, and disconnecting from said terminal from the specified port when registration has been completed;

upon receiving a short message containing said character information from said ISDN, determining whether said terminal is registered for said character information service; and, transferring said service message containing said character information to be displayed in a display unit of said registered terminal.

2. The method as defined in claim 1, wherein said service message uses user-user information (UUI) as set forth under International standard organization (ISO) to be adapted to said ISDN protocol.

3. The method as defined in claim 1, wherein said service message is transmitted through D-channel of said ISDN.

4. The method according to claim 1, wherein the registering step is performed by using an on-line selection menu.

5. The method according to claim 1, wherein the registering step is by direct communication between an operator of the PBX and the ISDN.

6. A method for providing a character information service to display character information on a terminal by a private branch exchange (PBX) through an integrated services digital network (ISDN), said method comprising the steps of:

transmitting a service message to a subscriber from said ISDN periodically during an idle state of an ISDN channel;

determining whether said service message is said character information;

in the event that said service message is said character information, outputting said service message on a display unit of said terminal; and, in the event that said service message is not said character information, connecting said terminal of said subscriber with a specified port of said ISDN.

7. The method as defined in claim 6, wherein said method further comprises the step of determining whether said terminal is registered for said character information service if said service message is said character information.

8. The method as defined in claim 7, wherein said step of determining whether said terminal is registered comprises the step of outputting said service message on said display unit of said terminal in response to a determination that said terminal is registered for said character information service.

9. The method as defined in claim 6, wherein said service message uses user-user information (UT) as set forth under International standard organization (ISO) to be adapted to said ISDN protocol.

10. The method as defined in claim 6, wherein said service message is transmitted through D-channel of said ISDN.

\* \* \* \* \*